UNITED STATES PATENT OFFICE.

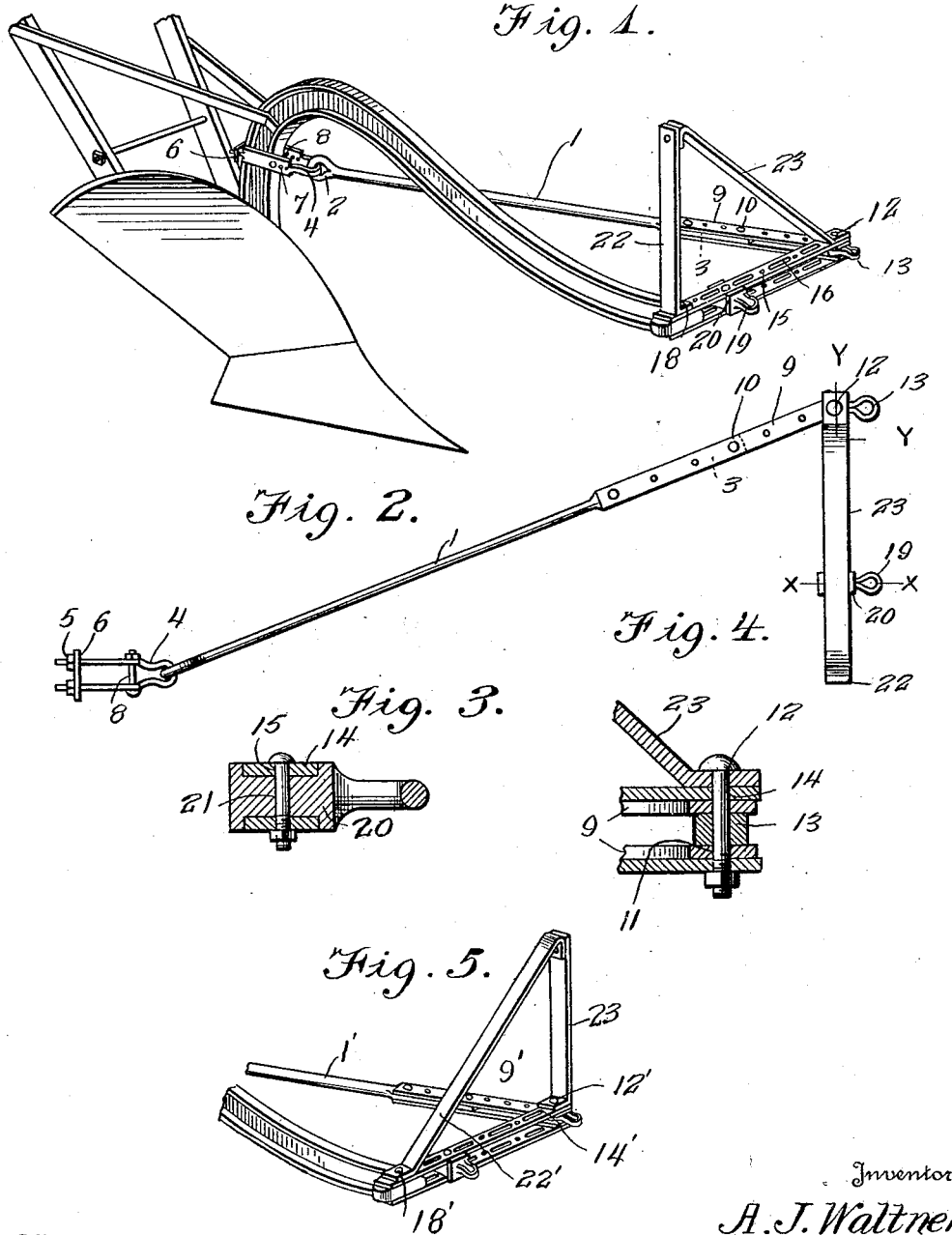

ADOLPH J. WALTNER, OF FREEMAN, SOUTH DAKOTA.

ADJUSTABLE PLOW-HITCH.

1,118,084. Specification of Letters Patent. Patented Nov. 24, 1914.

Application filed June 22, 1914. Serial No. 846,617.

*To all whom it may concern:*

Be it known that I, ADOLPH J. WALTNER, a citizen of the United States, residing at Freeman, in the county of Hutchinson, State of South Dakota, have invented certain new and useful Improvements in Adjustable Plow-Hitches; and I do hereby declare the following to be a full, clear, and exact description of the invention, such as will enable others skilled in the art to which it appertains to make and use the same.

This invention relates to plows and an object thereof is to provide an attachment for a plow which will facilitate the drawing of the same.

A further object of the invention is to provide a device by means of which horses may be hitched to a plow either of the hand or machine type so that they will not be compelled to walk on the plowed field.

A still further object of the invention is to provide a device of this character which will apply the pull directly to the plow and which has no tendency to bend the hitching beam.

With the above and other objects in view, such as will appear as the description progresses, my invention comprises the combination and arrangement of parts as hereinafter set forth and subsequently claimed.

Referring to the drawing: Figure 1 is a perspective view of my device hitched to a plow. Fig. 2 is a plan view thereof detached from the plow. Fig. 3 is a sectional view on line X—X of Fig. 2. Fig. 4 is a sectional view on line Y—Y of Fig. 2. Fig. 5 is a detail perspective view of a modification of my device.

Referring to the drawing in detail wherein like parts are represented by like characters throughout the several views: My device, which is adapted to be applied to any ordinary plow, consists of a main rod 1 having a loop 2 on one of its ends and a series of apertures 3 in its other end, which end is rectangular in cross section. Pivotally connected to the loop 2 is a clevis 4 of U-shape and having the ends of the legs threaded on which are mounted nuts 5 for securing the plate 6 on the said ends of the clevis. In the arms of the clevis are registering openings 7 spaced apart and adapted to accommodate a bolt 8. This clevis is attached to the vertical portion of the beam of a plow secured thereon by the plate 6 and the bolt 8 and may be attached to beams of various sizes because of the provision of the holes 7 for accommodating the bolt 8. Attached to the forward end of the rod on the sides thereof are horizontally disposed strips 9 which are secured to the said rod by bolts 10. These strips each have at their rear ends a series of apertures which are arranged to be alined with each other and with the apertures 3 in the rod 1 so that by withdrawing the bolts 10 therefrom the point of securement of this rod 1 to the strips may be varied. From this construction it may be seen that I have provided a connecting member which is adjustable in length and which may be held in any adjusted position.

In the forward end of each of the strips 9 is a hole 11 having a bolt 12 passing therethrough. Mounted on this bolt and between the strips 9 is a clevis 13. A pair of parallel extension rods 14 are secured to the ends of the strips 9 by the bolt 12. Provided in the said rods 14 and arranged to register with each other are a series of apertures 15 and slots 16. These rods 14 have at their other ends holes through which a bolt 18 passes and secure the same to the forward end of the plow beam. It is to be understood that the construction of the rods 14 may be somewhat varied at their points of attachment to the plow to accommodate them to plows of different styles. Mounted between the said rods 14 and slidable thereon is a clevis 19 having shoulders 20 thereon to prevent the same from being withdrawn therebetween the rods. This clevis has also a hole 21 therein arranged to be brought into registration with any of the holes 15 in the rods 14 and a bolt passed therethrough. It may be thus seen that by withdrawing the bolt from these members and sliding this last mentioned clevis which is attached to the whiffle-tree on the horses and securing it in any one of a number of positions, the points of application of the load may be varied.

It is to be understood that the main rod 1 which is connected to the vertical part of the plow beam extends at an acute angle thereto, the vertex of which angle is at the point where the rod meets the beam. The rods 14 in turn extend at an acute angle to the said main rod and at a right angle to the plow beam, to the end of which they are attached.

In order that the described device may be braced I have secured to the bolt 12 an upwardly extending strip 22 extending at right angles to the strips 9. Connected to the upper end of this strip 22 is a diagonally extending strip 23 which is attached at its lower end to the bolt which secures the arms 14 to the forward end of the plow beam.

In the embodiment of my invention shown in Fig. 5 the structure is similar to that shown in Fig. 1 with the exception of the construction of the brace strips. A strip 22' is secured to the forward end of the plow beam by the bolt 18' and extends diagonally upwardly therefrom. Secured to the upper end of this strip 22' is a second strip 23' which extends vertically downwardly therefrom and is secured to the ends of the strips remote from the end of the plow beam by a bolt 12' which bolt also secures the strips 14' and 9' together at this point. It has been found that this means of bracing is very effective.

It may be seen that I have provided an adjustable plow hitch which will be attached to the plow beam adjacent the plow and at the forward end of the beam in such manner that the pull exerted by the horses hitched thereto will be directly on the plow and will have no tendency to twist the plow beam. I have further provided a device which is adjustable so as to vary the length of the main draft rod so that the device may be adjusted to fit any size plow. I have further provided a clevis which is adjustably secured to the device so that the point of application of the load may be varied when it is desirable to use a greater or less number of horses than has been previously used, and I have provided the device with a clevis attached to the forward end of the main draft rod so that one horse may be used with the device.

By providing the aforementioned mechanism it is possible to hitch a number of horses to a plow to one side thereof so that they will not be forced to walk on the plowed ground and yet so that the plow beam will not be twisted.

I do not wish to be limited to the particular construction of my device, for it is obvious that numerous mechanical changes may be made without departing from the spirit of the invention.

What is claimed is:—

1. In combination with a plow, a clevis secured to the vertical portion of the beam thereof, a draft rod swiveled to the clevis and extending forwardly at an angle to said beam, strips adjustably secured to the forward end of said draft rod, spaced parallel strips secured to the ends of the first mentioned strips and to the forward end of the plow beam to space the draft rod therefrom, a clevis adjustably mounted between said last mentioned strips and an upwardly arched supporting member secured to each end of said strips to brace the same with respect to the plow beam.

2. In combination with a plow, a longitudinally adjustable draft rod secured to the vertical portion of the plow beam and extending at an angle to the forwardly extending portion of the said beam, spaced parallel strips having registering apertures therein attached to the forward end of the said adjustable rod and to the forward end of the plow beam and arranged to space the said rod therefrom, an arched member secured to the ends of said spaced parallel rods to support the same, a clevis secured to the forward end of the draft rod and a second clevis slidably mounted between the spaced parallel bars to be adjusted therebetween, and means for securing said last mentioned clevis in any one of its adjusted positions.

In testimony whereof, I affix my signature, in the presence of two witnesses.

ADOLPH J. WALTNER.

Witnesses:
J. J. TSCHETTER,
ANDR. J. WALTNER.

Copies of this patent may be obtained for five cents each, by addressing the "Commissioner of Patents, Washington, D. C."